3,069,362
REACTIVATION OF MOLECULAR SIEVES
Rolland L. Mays, Williamsville, and Harrison B. Rhodes and Fred W. Leavitt, Buffalo, N.Y., assignors to Union Carbide Corporation, a corporation of New York
Filed July 2, 1959, Ser. No. 824,643
14 Claims. (Cl. 252—419)

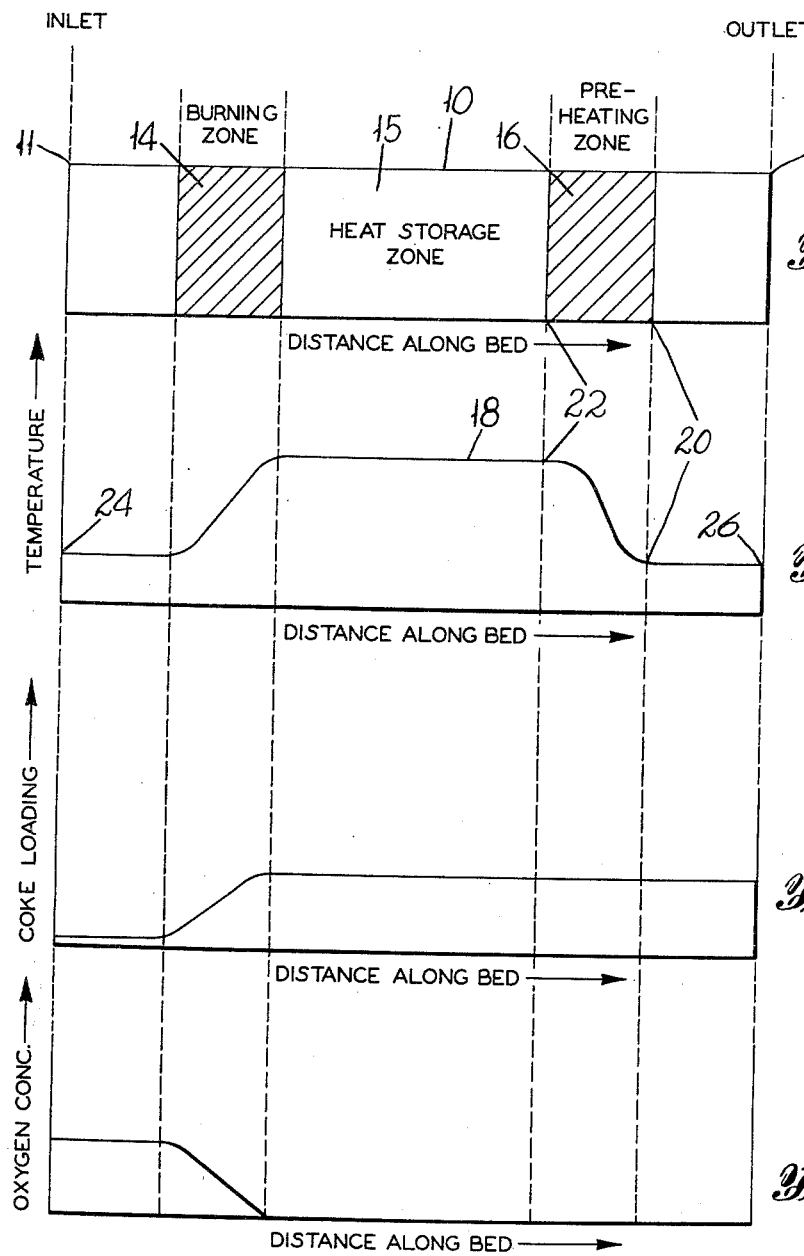

This invention relates to a method for reactivating crystalline zeolitic molecular sieves. More particularly, the invention relates to a process for removing carbonaceous deposits from crystalline zeolitic molecular sieves by means of controlled oxygen burn-off.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties.

The structure of crystalline zeolitic molecular sieves may be described as an open three-dimensional framework of $SiO_4$ and $AlO_4$ tetrahedra. The tetrahedra are crosslinked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example alkali metal and alkaline earth metal ions such as sodium, potassium, calcium and magnesium ions.

The crystal structure of such zeolites also exhibit interstices of molecular dimensions. The interstitial spaces are generally occupied by water of hydration. Under proper conditions, for example after at least partial dehydration, these zeolites may be utilized as efficient adsorbents whereby adsorbate molecules are retained within the interstitial spaces. Access to these channels is had by way of orifices in the crystal lattice. The openings limit the size and shape of the molecules that can be adsorbed. A separation of mixtures of foreign molecules based upon molecular dimensions, wherein certain molecules are adsorbed by the zeolite while others are excluded, is therefore possible. It is this characteristic property of many crystalline zeolites that has led to their designation as "molecular sieves."

Many synthetic and naturally occurring crystalline zeolites are known. They are distinguishable from each other on the basis of their composition, crystal structure and adsorption properties. A particularly suitable method for distinguishing these compounds is by their X-ray powder diffraction patterns. The existence of a number of zeolites having similar but distinguishable properties advantageously permits the selection of a particular member having optimum properties for a particular use.

Unlike common adsorbents, such as charcoal and silica gel, which show adsorption selectivities based primarily on the boiling point or critical temperature of the adsorbate, crystalline zeolitic molecular sieves exhibit a selectivity based on the size, degree of unsaturation, shape, polarity and polarizability of the adsorbate molecule. Among those adsorbate molecules whose size and shape are such as to permit adsorption by the zeolite, a strong preference is exhibited toward those that are polar, polarizable and unsaturated. This adsorption selectivity renders molecular sieves most useful in the separation of polar from less polar or non-polar molecules; of polarizable from less polarizable or non-polarizable molecules; of unsaturated hydrocarbon molecules from corresponding less unsaturated or saturated molecules; and of straight-chained aliphatic hydrocarbon molecules from branch-chained aliphatic, cycloaliphatic and aromatic hydrocarbon molecules.

It is to be noted that the rejection characteristics of crystalline zeolitic molecular sieves are as important as the adsorption characteristics. For example, the interstitial channels of calcium zeolite A are such that at their narrowest points molecules with critical dimensions greater than approximately 5 angstrom units will not readily enter into the channels. The term "critical dimension" as employed herein may be defined as the maximum dimension of the minimum projected cross-section of the adsorbate molecule. The term may also be defined as the diameter of the smallest cylinder which will accommodate a model of the adsorbate molecule using the best available values of bond distances, bond angles and Van der Waals' radii. Hence, molecules having critical dimensions greater than approximately 5 angstrom units will be rejected by calcium zeolite A, while those having smaller critical dimensions will be adsorbed.

The zeolites occur as agglomerates of fine crystals or are synthesized as fine powders and are preferably tableted or pelletized for large scale adsorption uses. Pelletizing methods are known which are very satisfactory because the adsorptive character of the zeolite, both with regard to selectivity and capacity, remains essentially unchanged.

Examples of crystalline zeolitic molecular sieves which may be reactivated by the process of the present invention are the following:

Zeolite A is a crystalline zeolitic molecular sieve which may be represented by the formula

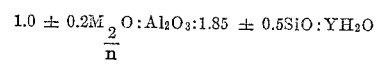

wherein M represents a metal, $n$ is the valance of M, and Y may have any value up to about 6. The as-synthesized zeolite A contains primarily sodium ions and is designated sodium zeolite A. Calcium zeolite A is a derivative of sodium zeolite A in which about 35 percent or more of the exchangeable sodium cations have been replaced by calcium. Similarly, strontium zeolite A and magnesium zeolite A are derivatives of sodium zeolite A wherein about 35 percent or more of the exchangeable sodium ions have been replaced by the strontium or magnesium ions. Zeolite A is described in more detail in U.S. Patent No. 2,882,243 issued April 14, 1959.

Zeolite D is a crystalline zeolitic molecular sieve which is synthesized from an aqueous aluminosilicate solution containing a mixture of both sodium and potassium cations. In the as-synthesized state, zeolite D has the chemical formula:

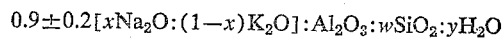

wherein "$x$" is a value from zero to 1, "$w$" is from about 4.5 to 4.9 and "$y$" in the fully hydrated form is about 7. Further characterization of zeolite D by means of X-ray diffraction techniques is described in copending application Serial No. 680,383, filed August 26, 1957. The preparative conditions for zeolite D and its ion-exchanged derivatives and their molecular sieving properties are also described therein.

Zeolite T is a synthetic crystalline zeolitic molecular sieve whose composition may be expressed, in terms of oxide mole ratios, as follows:

$$1.1 \pm 0.4[x\mathrm{Na_2O}:(1-x)\mathrm{K_2O}]:\mathrm{Al_2O_3}:6.9 \pm 0.5\mathrm{SiO_2}:y\mathrm{H_2O}$$

wherein "$x$" is any value from about 0.1 to about 0.8 and "$y$" is any value from about zero to about 8. Further characterization of zeolite T by means of X-ray diffraction techniques is described in copending application Serial No. 733,819, filed May 8, 1958, now U.S. Patent No. 2,950,952.

Zeolite X is a synthetic crystalline zeolitic molecular sieve which may be represented by the formula:

$$0.9 \pm 0.2 \mathrm{M}_{\frac{2}{n}}\mathrm{O}:\mathrm{Al_2O_3}:2.5 \pm 0.5\mathrm{SiO_2}:y\mathrm{H_2O}$$

wherein M represents a metal, particularly alkali and alkaline earth metals, $n$ is the valence of M, and $y$ may have any value up to about 8, depending on the identity of M and the degree of hydration of the crystalline zeolite. Zeolite X, its X-ray diffraction pattern, its properties, and methods for its preparation are described in detail in U.S. Patent No. 2,882,244 issued April 14, 1959.

Erionite is a naturally occurring crystalline zeolitic molecular sieve, described originally by Eakle, Am. J. Science (4) 6, 66 (1898). It is most readily identified by its characteristic X-ray powder diffraction pattern. The d-spacings in A., and relative intensities thereof, obtained on a well-crystallized specimen are tabulated below.

*X-Ray Powder Data, Erionite*

| d-Spacing, A: | Relative Intensity $I/I_0 \times 100$ |
|---|---|
| 11.38 | 100 |
| 9.06 | 10 |
| 7.50 | 10 |
| 6.56 | 40 |
| 6.24 | 10 |
| 5.68 | 10 |
| 5.34 | 10 |
| 4.56 | 10 |
| 4.31 | 40 |
| 4.15 | 20 |
| 3.80 | 20 |
| 3.74 | 40 |
| 3.58 | 30 |
| 3.30 | 10 |
| 3.27 | 10 |
| 3.20 | 10 |
| 3.16 | 10 |
| 3.14 | 10 |
| 3.00 | 5 |
| 2.92 | 5 |
| 2.86 | 30 |
| 2.83 | 30 |
| 2.805 | 20 |
| 2.67 | 10 |
| 2.59 | 5 |
| 2.49 | 10 |
| 2.47 | 10 |
| 2.20 | 5 |
| 2.11 | 5 |
| 1.88 | 5 |
| 1.83 | 5 |
| 1.77 | 10 |
| 1.65 | 10 |

Other examples of synthetic crystalline zeolitic molecular sieves which may be reactivated by the process of the present invention are: Zeolite L, described and claimed in U.S. patent application Serial No. 711,565 filed January 28, 1958, now abandoned and zeolite Y, described and claimed in U.S. patent application Serial No. 728,057 filed April 14, 1958, now abandoned.

Other examples of natural crystalline zeolitic molecular sieves which may be reactivated by the process of this invention are chabazite, faujasite and mordenite.

The crystalline molecular sieves zeolite A, zeolite X, zeolite Y and erionite have been found particularly useful in the process of the present invention.

Crystalline zeolitic molecular sieves may be used in a wide variety of processes involving the separation of carbon-containing compounds from mixtures with other compounds. For example, normal paraffins may be separated from mixtures with other hydrocarbons because the normal paraffins are preferentially adsorbed within the pores of certain molecular sieves. In other processes, olefins may be recovered from refinery gas streams, acetylenic compounds may be removed from olefins, and sulfur-, oxygen-, and nitrogen-containing organic compounds may be separated from hydrocarbon compounds.

In many processes utilizing crystalline zeolitic molecular sieves, carbonaceous material which is non-volatile at the operating conditions for either adsorption or desorption is deposited on the surface and within the pores of the molecular sieve. The deposit of non-volatile carbonaceous matter may result, for example, from polymerization of unsaturated compounds, from isomerization, or from thermal decomposition of any carbon-containing compounds which come in contact with the molecular sieves.

This carbonaceous matter which is non-volatile at the operating temperature will be referred to hereinafter as coke. The deposition of coke results in a reduction in the adsorption capacity of the molecular sieve. Consequently, the molecular sieve must be periodically reactivated by removal of the coke deposits.

The periodic reactivation of a molecular sieve by removal of coke deposits must be carried out in such a manner that high selective adsorptive capacity of the sieve is retained and no substantial damage is done to the crystal structure of the sieve. The adsorptive capacity must be retained not only on the surface of the molecular sieve crystals but also throughout the entire pore volume of the crystals. Further, the selective adsorption properties of crystalline zeolitic molecular sieves depend on the uniformity of the pores in the crystal lattice. Therefore any substantial damage to the essential crystal structure destroys the selective properties of the sieve.

Crystalline zeolitic molecular sieves may also be loaded, within the pores of the crystal structure, with a variety of metals such as zinc, platinum and palladium. The reactivation process of the present invention also applies to such metal loaded molecular sieves when the metal itself is inert to oxygen at burnoff temperature. For example, the adsorption capacity and catalytic activity of platinum loaded zeolite Y may be reactivated by the coke burnoff process described hereinbelow.

The several species of crystalline zeolitic molecular sieves described hereinabove may be continuously maintained in an inert atmosphere and at temperatures up to about 1290° F. without substantial damage to the crystal structure. At temperatures above about 1325° F., the essential crystal structure of these sieves is rapidly and almost completely destroyed.

The crystal structure of these molecular sieves may also be substantially damaged at temperatures below about 1290° F. by contact with an atmosphere containing appreciable quantities of water vapor. Therefore the water vapor concentration in contact with the molecular sieve during reactivation must be carefully controlled.

It is an object of this invention to provide a process for reactivating crystalline zeolitic molecular sieves.

It is a further object of this invention to provide a process for removing non-volatile carbonaceous matter from crystalline zeolitic molecular sieves without substantial damage to the crystal lattice of the sieve crystals.

A still further object of the invention is to provide a process for maintaining the adsorption capacity of crystalline zeolitic molecular sieves by periodic removal of coke deposits from such sieves.

Another object of the invention is to provide a process for maintaining the adsorption capacity and catalytic activity of metal loaded crystalline zeolitic molecular sieves when the metal is inert to oxygen at process temperatures.

Other objects of the invention will be apparent from the description of the invention and the appended claims.

In the drawings: FIGS. 1–4 are schematic diagrams illustrating the general characteristics of the reactivation process of this invention.

Figure 5:
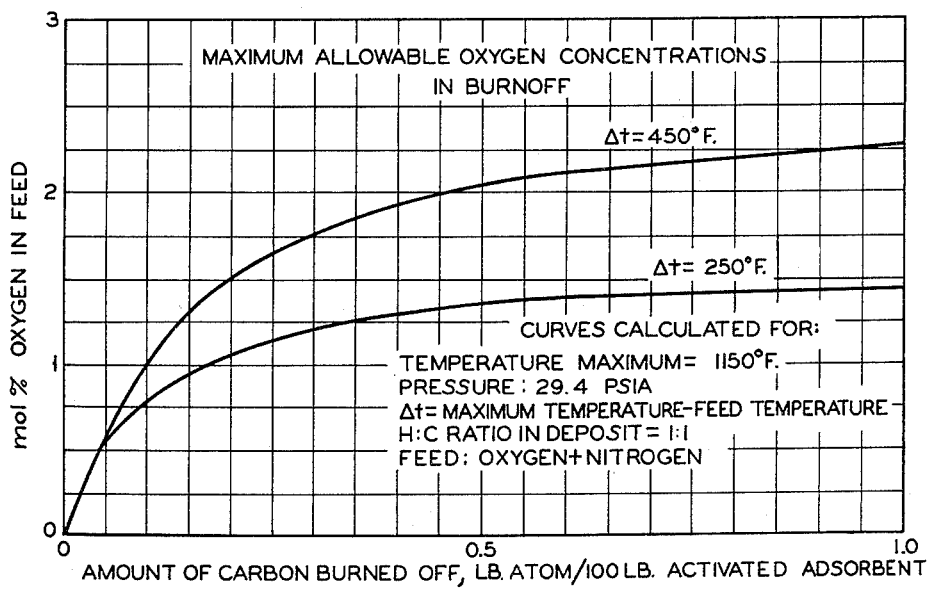
FIG. 5 is a graph illustrating the relationship between maximum allowable oxygen content in the burn-off gas and the amount of coke to be removed.

The coke deposits which must be removed from molecular sieves contain primarily carbon and hydrogen. The ratio of hydrogen atoms to carbon atoms in the coke is frequently as high as about 2 to 1. In addition, the coke may contain nitrogen, sulfur, and other elements which are found in organic chemical compounds. In particular, cokes containing appreciable amounts of sulfur may be removed by the process of this invention.

The general characteristics of the reactivation process of this invention are described with the aid of FIGS. 1–4. A bed of crystalline zeolitic molecular sieve on which coke has deposited, represented by the elongated rectangle 10 in FIG. 1 having inlet end 11 and outlet end 12, is initially heated to a temperature above the ignition temperature of the coke.

The apparent ignition temperature of an element or compound, whether solid, liquid, or gaseous, is the temperature required to initiate or cause oxidation sufficiently rapid to be self-sustained when the heating or heated element is removed. In the process of this invention a convenient indication of whether a bed of coked molecular sieve is at or above its ignition temperature is whether or not substantially all of the oxygen introduced is consumed in passing through the bed, provided of course that sufficient coke is present to react with the oxygen. The bed in the usual case is sufficiently large so that the reactivation process may be considered as adiabatic. A flow of oxygen-containing gas, preferably at about the same temperature as the bed, is then passed through the bed from inlet to the outlet ends. A steady state burning wave 14 forms and moves through the bed. It is assumed that the bed is long enough for a steady state wave to form at the particular gas flow rate. As this zone 14 progresses, the inert components in the gas passing through it are heated, carry the heat forward ahead of the burning front, and then lose the heat to the solids further forward in the bed. The net result is a relatively slowly moving burning zone 14 separated from a more rapidly moving solids preheat zone 16 by a linearly expanding region 15 of constant temperature heat storage. After the faster moving preheat zone 16 has reached the outlet end of the bed, the entire bed ahead of the burning zone will be at approximately constant temperature 18.

Substantially all of the oxygen in the gas is consumed in the burning zone. At the same time the coke loading is reduced from the initial value. The linear velocity of this zone through the bed thus depends primarily on the rate at which oxygen is fed and the amount of coke burned. FIG. 1 shows the burning 14, heat storage 15 and preheating 16 zones for a molecular sieve bed 10 during reactivation. FIG. 2 is a plot of the temperature profile of the bed 10 showing the relative temperatures in the various zones, FIG. 3 shows the relative coke loading in the various zones, and FIG. 4 shows the relative oxygen concentrations in the various zones, all plotted as a function of the distance along the bed 10.

The above factors, together with the heat of combustion for the particular coke, also fix the rate of heat generation in the bed. It should be noted that the maximum temperature generally occurs at the leading edge of the burning wave or zone 14 where the last of the oxygen is used. This is the temperature at which heat passes to the storage zone.

In the solids preheating zone the gas and solids temperatures will essentially coincide at both the leading 20 and trailing 22 edges of the zone. Since both gas and solids are thus subjected to essentially the same temperature change, the linear velocity of this zone will be independent of the absolute temperature change and will vary directly with the gas flow rate (neglecting changes with temperature in the ratio of the heat capacities of the gas and solids which may alter the velocity slightly). The inlet temperature 24 and outlet temperature 26 are not necessarily equal, but vary depending upon the particular process conditions.

The effects of feed oxygen concentration or gas flow rate on the temperature increase across the burning zone 14 can be determined from consideration of the burning zone alone or from a comparison of the velocities of the burning 14 and preheat zones 16. Examination of the burning zone shows that the gas which passes through must perform two functions. It must remove the sensible heat from the solids to cool the bed from the peak temperature at the leading edge of the wave down to the inlet gas temperature and it must carry away the heat of combustion.

If the oxygen concentration is increased while the total gas flow is held constant, a proportionate increase will occur in both the overall burning rate and the amount of heat from the oxidation that must be carried away by the gas. The higher burning rate will also cause the combustion front to move through the bed more rapidly so that the rate at which sensible heat must be removed is increased. Since the amount of inert gas available to carry the heat is unchanged, the added heat load can only be accomodated by an increase in temperature at the leading edge of the burning zone.

Consideration of both of the zones 14 and 16 also leads to the conclusion that increasing oxygen concentration raises the temperature near the leading edge of the burning zone. All of the heat generated by the burning of the coke must therefore be stored between these two zones. The greater the difference in velocity between the faster preheat zone and the slower burning zone, the larger will be the heat storage zone between them and the lower will be the temperature for a given amount of coke burned. Conversely, an increase in oxygen concentration will give a proportionate increase in the velocity of the burning zone with essentially no change in the velocity of the preheating zone. The resulting shorter heat storage zone must therefore be at a higher temperature in order to accommodate the same amount of heat.

The general considerations just illustrated show that as the concentration of oxygen is increased (at the same total gas feed rate) the burning zone will continue to move with increasing rapidity while the preheating zone velocity is essentially constant. A critical oxygen concentration will finally be reached where the two zones come together and all of the heat generated will be stored in the burning zone. The temperatures in the burning zone may then climb very rapidly to an extremely high level and result in considerable damage to the crystal structure of the molecular sieve.

The effect of variations in total gas flow rate at a constant oxygen concentration also follows directly from the relationship between the zone velocities. Here an increase in feed rate will give a proportionate increase in not only the burning zone velocity but also the preheat zone velocity. For a given amount of carbon burned the distance between the zones will thus be the same so that no change will occur in the temperature at the leading edge of the burning zone. It follows then that for a fixed coke loading and feed gas composition, the temperature rise across the burning wave is independent of the feed gas rate. Thus, the preheat zone velocity depends primarily on the gas volume flow rates and the burning zone velocity depends primarily on the gas flow rate and oxygen concentration in the burn-off gas.

From the above discussion it is apparent that careful and precise control of the oxygen concentration in the burn-off gas mixture is required.

Such control of the oxygen concentration may be obtained by setting the upper limit on oxygen feed concentration for a given set of other conditions such as pressure, feed temperature and flow rate. A preferred set of conditions is the following: Feed temperature—600° F. to 900° F., total pressure—1 atmosphere to 10 atmospheres, superficial mass velocity of gas—20 to 5,000 lb./(hr.) (sq. ft.). The lower limit of feed temperature in this preferred set of conditions is set because temperatures below 600° F. result in excessively slow oxidation rates. The upper limit on feed temperature is set because higher temperatures unduly restrict the oxygen concentrations that can be used; that is, the upper limit of feed temperature must not be too close to the maximum permissible exit gas temperature of 1150° F.

Pressures below 1 atmosphere are operable but are not preferred because of the danger of leakage of air into the system. Pressures above 10 atmospheres may lead to excessively high oxidation rates and make it more difficult to keep particle temperatures and ambient gas temperatures approximately equal.

Superficial mass velocities below about 20 lb./(hr) (sq. ft.) require very long times for coke burn-off while superficial mass velocities above 5000 lb./(hr.) (sq. ft.) lead to very high pressure drops and high power requirements for maintaining the flow. The maximum temperature in the burning zone, as discussed hereinabove, is 1150° F. The difference between this maximum allowable temperature and the feed temperature, designated hereinafter $\Delta t$, may be controlled by adjusting the concentration of oxygen in the feed gas.

FIGURE 5 is a plot of maximum mole fractions of oxygen in the feed gas as a function of the reduction in carbon loading for two different values at $\Delta t$. The process conditions on which the data of FIGURE 5 are based are the following: Total pressure of two atmospheres, maximum temperature of the gas leaving the burning zone is 1150° F., the atomic ratio of hydrogen to carbon in the coke is 1 to 1, and the feed gas contains only oxygen and nitrogen. Also in calculating the data such as that shown in FIGURE 5 the following assumptions are made: (a) flow rate and bed length are such that combustion occurs almost entirely in a relatively short burning front which progresses along the bed as burn-off proceeds, as illustrated in FIGURES 1 through 4; (b) the bed wall is adiabatic; (c) pressure is uniform throughout the bed and is relatively constant; (d) the bed initially has a uniform coke deposit and a uniform temperature; (e) the feed gas has a constant temperature; (f) axial conduction and diffusion are neglected; and (g) the difference between the temperature of the adsorbent particles and the gas temperatures is negligible.

The difference between particle temperature and gas temperature may be kept small by operating with some or all of the following conditions: (a) low temperature, (b) low coke deposit loading; (c) low oxygen partial pressure, (d) high gas flow rate, and (e) small adsorbent particles. These conditions are all inter-related. For example, if larger particles, higher oxygen partial pressures, higher temperatures or a combination of these are used, the gas flow rate must be increased to prevent an excessive temperature difference. Where the deposit loading is high and the adsorbent particle size is large, it may be necessary to operate not only at high flow rate but also at lower feed temperatures or lower oxygen concentrations. Thus, many combinations of feed temperature, oxygen partial pressure, flow rate and particle size may be used for burn-off of a given coke deposit.

The curves in FIGURE 5 are affected only slightly (plus or minus about 0.1 percent) in the following ranges of operating variables: maximum temperature 900° F. to 1150° F., total pressure 1 to 10 atmospheres, atomic ratio of hydrogen to carbon in coke of 0.8 to 1.5. Factors which may affect the maximum allowable mole percent oxygen in the feed for the curves of FIGURE 5 are large quantities of hydrogen, carbon monoxide and carbon dioxide in the feed gas.

The curves of FIGURE 5 were constructed from data pertaining to feed gas mixtures wherein the non-oxygen gas component was nitrogen. Where the non-oxygen components include active gases such as carbon dioxide, carbon monoxide and hydrogen there will be some shifting of the curves. For example, a gas mixture containing 10 mole percent each of carbon dioxide, carbon monoxide and hydrogen and the balance nitrogen shifts the 450° C. curve upward about 0.4 mole percent in the range of about 2 weight percent coke and shifts the curve downward as much as 0.25 mole percent at coke loadings greater than about 3 percent.

The maximum allowable oxygen concentration in the feed gas may be increased somewhat if the initial coke loading in the adsorbent bed increases. For example, where the $\Delta t$ may be as great as 450° F. the burn-off may be carried out with about (a) two mole percent oxygen when 3 to 7 weight percent coke is burned-off, (b) one mole percent oxygen when 0.5 to 3 percent coke is burned-off, and (c) less than 0.5 mole percent oxygen when less than 0.5 weight percent coke is burned-off. For ⅛-inch calcium zeolite A pellets and operating conditions of feed temperature 600° F. to 750° F., total pressure 1 atmosphere to 2 atmospheres, gas flow rate of at least about 100 lb./(hr.) (sq. ft.) and a $\Delta t$ of up to 250° F., the maximum permissible oxygen concentrations in the feed gas are about (a) one mole percent oxygen when 1 to 5 weight percent coke is burned off, and (b) less than one mole percent oxygen when less than 1 percent coke is burned-off.

In addition to careful control of the oxygen concentration, the amount of heat generated in the coke burnoff step may also be reduced by preheating the coke prior to burn-off. This preheating step is particularly desirable when the hydrogen to carbon ratio in the coke is greater than about one. The heat of combustion of the coke increases with its hydrogen content. The preheating treatment reduces the hydrogen content of the coke by driving off gases and vapors such as hydrogen, and the hydrogen-rich materials methane, ethane, isobutene and the like.

In the preferred embodiment of the present invention the molecular sieve bed is preheated with a stream of dry inert gas for about two hours at 900° F., or shorter times at higher temperatures up to about 1050° F., to reduce the hydrogen to carbon ratio in the coke to about one. The resulting decrease in the heat of combustion of the coke makes it easier to control the temperature rise in the molecular sieve bed during the burn-off step. The term "inert gas" as used herein refers to the oxygen-free gas mixture obtained from a conventional inert gas generator as well as to the noble gases helium, neon, argon and the like. The inert gases used in the process of this invention may therefore contain, for example, substantial quantities of nitrogen and some carbon dioxide and carbon monoxide.

The preheating also tends to stabilize the coke by promoting the formation of condensed aromatic rings.

These condensed ring systems burn more evenly than randomly arranged carbon chains and the heat produced in the burn-off process is therefore more evenly distributed.

The desired reduction in hydrogen to carbon ratio and stabilization of the coke may also be obtained by longer preheating times at lower temperatures. In some processes, for example, it may be convenient to preheat the coke at about 500° F. for 24 hours. The preheating of the coke may also be carried out by starting at lower temperature and gradually increasing the temperature to the 900° F. to 1050° F. range.

Some preheating of the coke always takes place during the burn-off process even in the absence of a separate preheating step. This preheating is supplied by the preheating zone 16 and heat storage zone 15 described hereinabove with reference to FIG. 1.

Preheating of the coke may also be carried out under reduced pressure. In this embodiment, heat may be supplied to the molecular sieve bed from heating elements surrounding the bed or from heating coils disposed within the bed. The gases and volatilized hydrogen-rich materials are removed from the bed under reduced pressure.

The water vapor partial pressure in contact with the molecular sieve must also be carefully controlled to prevent damage to the sieve at the temperatures encountered in the burn-off step. Water vapor may come from two principal sources, (1) the gas used in the preheating and burn-off steps and (2) the water resulting from the reaction of the oxygen and/or carbon dioxide with the hydrogen-containing material in the coke. The amount of water vapor in contact with the molecular sieve may be conveniently measured by determining the water vapor concentration in the gas stream at the outlet of the molecular sieve bed. The maximum level of water vapor that can be tolerated in the effluent gas depends upon the temperature in the bed, the total time for which the bed is exposed to the water vapor and the amount of loss in adsorptive capacity which can be tolerated in the particular process. The time of exposure depends on the number of burn-offs to be carried out and the time required for each of these factors may vary widely depending upon the particular process employing the crystalline zeolitic molecular sieve adsorbent. For example, some hydrocarbon separation processes require burn-offs as infrequently as once in six months. The amount of decrease in adsorptive capacity which can be tolerated may vary from about 10 percent up to about 15 percent.

Figure 6:
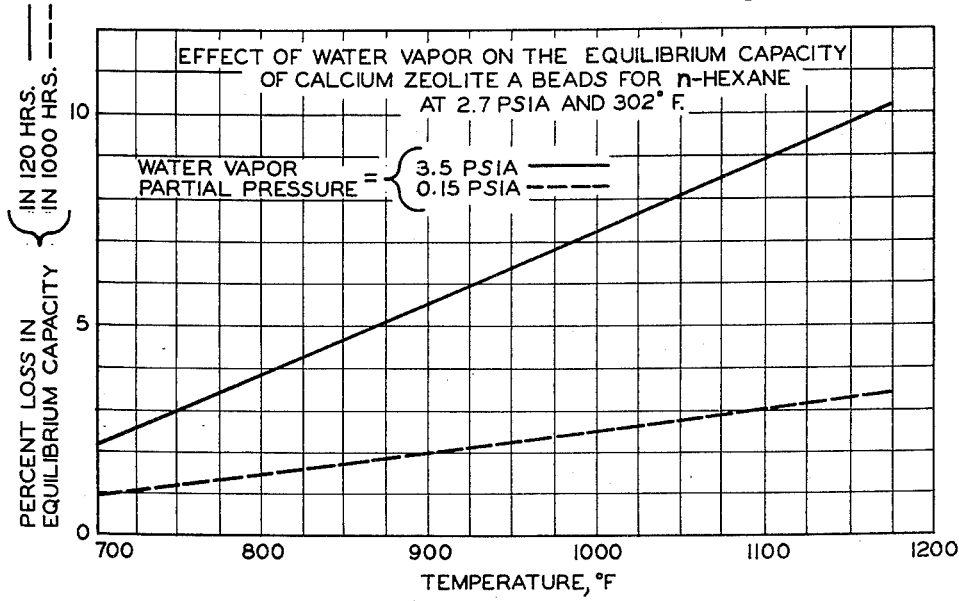
FIG. 6 is a graph illustrating the effect of water vapor on the adsorption capacity of crystalline zeolitic molecular sieves.

FIGURE 6 shows the effect on the equilibrium capacity of calcium zeolite A when exposed to water vapor under varying conditions of water vapor partial pressure, exposure time and temperature. The solid curve of FIGURE 6 represents an exposure time of 120 hours to water vapor at 3.5 p.s.i.a. As the exposure temperature increases the percent loss in equilibrium capacity also increases. The loss for n-hexane adsorption capacity is about 3 percent at 750° F., about 6 percent at 925° F. and about 10 percent at 1150° F. For a slightly higher water vapor partial pressure of about 4 p.s.i.a., the loss in equilibrium capacity approaches the maximum amount which can be tolerated in most processes.

The dotted line in FIGURE 6 is for a water vapor partial pressure of 0.15 p.s.i.a. and an exposure time of 1000 hours. Under these conditions the loss in equilibrium capacity is about 1 percent at 750° F., about 2 percent at 925° F. and about 3.5 percent at 1150° F.

Exposure of calcium zeolite A pellets to water vapor at 14.7 p.s.i.a. for only 20 hours resulted in about a 20 percent loss in equilibrium adsorption capacity at 925° F. Thus the maximum allowable water vapor partial pressure in the exit gas is about four pounds per square inch absolute (p.s.i.a.) and it is preferable to have the water vapor partial pressure in the exit gas below about 0.15 p.s.i.a.

The water vapor partial pressure in the gas entering at the inlet of the molecular sieve bed may be controlled by providing drying apparatus for the inert gas (or inert gas-oxygen mixture) employed in the process. Conventional gas drying equipment may be used for this purpose. The water vapor partial pressure in the gas stream may be conveniently kept within the desired limits by maintaining the operating pressure at about 1 to 2 atmospheres, that is, maintaining the operating pressure in the low pressure region of the preferred pressure range.

The water vapor concentration resulting from the burn-off reaction may be controlled in two ways. The first way is by regulation of the oxygen concentration in the burn-off gas. The lower the oxygen concentration, the slower will be the rate of production of water in the burn-off reaction of the hydrogen-containing coke. The second method is by preheating the coke as described hereinabove. The pre-heating treatment reduces the hydrogen to carbon ratio in the coke and therefore reduces the amount of material which can form water during the burn-off reaction. It will be apparent that preheating of the coke to reduce the hydrogen to carbon ratio has two beneficial effects; the heat of combustion of the coke is lowered and the amount of water-forming material is reduced.

In conducting the burn-off step of the present invention at least the coke near the gas inlet end of the adsorbent bed must be heated to its ignition temperature before the burn-off reaction can begin. The hot oxygen-containing gas stream provides a convenient method for heating the coke. The ignition temperature varies with the nature and composition of the particular coke, but a temperature of at least 600° F. has been found preferable.

At the start of the burn-off step, the oxygen concentration in the gas is controlled so that the temperature in the burning and heat storage zones does not rise above about 1150° F., and it is preferable to maintain the temperature in the range from about 900° F. to about 1050° F.

Although the crystalline zeolitic molecular sieves described hereinabove may be maintained at temperatures up to 1290° F. without substantial damage to their crystal structures, the maximum permissible temperature during the burn-off step is about 1150° F. This is because the 1150° F. temperature is measured by thermocouples or other devices which record the average or bulk temperature in a particular area of the molecular sieve bed. There are, however, portions of the individual molecular sieve crystals which may attain higher transient temperatures during burn-off. This is particularly true of areas where the burning of the coke is actually taking place. By maintaining the bed temperature below about 1150° F., damaging transient temperatures above about 1290° F. are almost entirely avoided.

It is preferably to maintain the oxygen concentration below about two mole percent during the time that the burning wave 14 (FIGURE 1) is progressing along the bed. After the burning wave has traveled the entire length of the bed, the coke loading will be substantially reduced, as shown in FIGURE 3, usually to less than 0.3 weight percent. Increased oxygen concentration may then be used to remove the residual coke without fear of damage to the sieve crystals, and oxygen concentrations of 20 percent or greater may be employed if desired. The removal of the last traces of coke may be a slow process and oxygen concentrations up to 100 percent may often be used advantageously to increase the burn-off rate for such coke. The temperature and water vapor concentration during residual coke removal must be maintained below about 1150° F. and four p.s.i.a., respectively. The preferred conditions are a temperature in the range of about 900° F. to about 1050° F. and a water vapor concentration below about 0.15 p.s.i.a.

During the initial burn-off higher initial oxygen concentrations may be used for higher coke loadings while for final burn-off the oxygen concentration is increased as the coke loading decreases. During initial burn-off the most active part of the carbonaceous deposit burns quite rapidly on contact with oxygen. Combustion rates are high and the amount of heat developed in the bed is limited almost solely by the amount of oxygen entering the bed. Under these circumstances the oxygen concentration may be increased for higher initial coke loadings because an increase in the initial coke loading decreases the burning zone velocity but has little effect on the preheat zone velocity. It follows than that for fixed total gas flow rate and fixed oxygen feed concentration the temperature rise across the burning zone is decreased by an increase in the initial coke loading. As a result, a higher oxygen concentration may be used with higher initial coke loadings.

At the end of the initial phase of burn-off the most active part of the coke deposit has been removed leaving relatively inactive material which burns more slowly. The rate of heat generation is then limited by local oxidation rates in the adsorbent particles rather than by the rate of supply of oxygen to the bed. The overall rate of heat generation should be kept more or less constant. As the last traces of the deposits burn-off, the part remaining becomes more and more difficult to oxidize. The burning rates tend to drop but can be maintained at a satisfactorily high level by increasing the oxygen content as described hereinabove.

EXAMPLE I

This example illustrates the oxidation reactivation of a crystalline zeolitic molecular sieve used in a process for recovery of olefins from refinery gas streams. The feed gas stream used in this example had the following approximate composition:

| Component: | Volume percent |
|---|---|
| Methane | 5 |
| Ethylene | 8 |
| Propylene | 12 |
| Ethane | 35 |
| Propane | 40 |

Olefins were removed from the mixture by passing the gas at room temperature through a bed of sodium zeolite X in the form of 1/16 inch pellets. The bed was one inch in diameter and 6 inches long. The initial capacity of the bed for adsorbed material was about 8.5 weight percent. After propylene breakthrough, desorption of the olefins was accomplished as follows: the bed was purged with ethane at atmospheric pressure and room temperature at a space velocity of 15 vol./vol./hr. While purging, the bed temperature was raised from 27° to 572° F. over a period of 45 minutes. After 10 minutes at 572° F. the purge was stopped and the bed was cooled to room temperature before the next adsorption cycle. The decreasing breakthrough loadings for propylene are tabulated below:

| Cycle Number | 80 | 188 | 342 | 535 |
|---|---|---|---|---|
| $C_3H_6$ Breakthrough Capacity (wt. percent) | 6.4 | 2.2 | 0.8 | about zero |

Following cycle 627, an oxidative reactivation was carried out as follows: The bed was purged with dry nitrogen at a space velocity of 750 vol./vol./hr. while the temperature of the bed was gradually increased to 662° F. Holding the bed at 662° F., 1 mol percent oxygen was introduced with the nitrogen purge gas causing the bed temperature to rise to 707° F. After one hour, the temperature returned to 662° F. where it held for 24 hours. The oxygen concentration was then increased to 2 mole percent causing an increase in bed temperature to 734° F. After the bed temperature again returned to 662° F. for two hours, the reactivation was terminated. The breakthrough capacity for propylene following regeneration was 8.4 weight percent.

Normal cycling of the bed was resumed with no increase in the rate of capacity fall-off experienced with the fresh bed. The capacity data are tabulated below:

| Cycle Number | 628 | 735 | 800 |
|---|---|---|---|
| $C_3H_6$ Breakthrough Capacity (wt. percent) | 8.4 | 6.7 | 5.2 |

Following cycle 831, a second reactivation was carried out as follows: The bed was purged with dry nitrogen at a space velocity of 750 vol./vol./hr. while the temperature of the bed was gradually increased to 662° F. Holding the bed temperature at 662° F., 1 mole percent oxygen was introduced with the purge gas causing the inlet bed temperature to rise to 716° F. The temperature returned to 662° F. where it was held for 24 hours, at the end of which the reactivation was terminated. The subsequent breakthrough capacity for propylene was 8.8 weight percent.

Normal cycling of the bed was again resumed with no significant increase in the rate of fall-off of propylene capacity as shown below:

| Cycle Number | 840 | 912 |
|---|---|---|
| $C_3H_6$ Breakthrough Capacity (wt. percent) | 8.8 | 6.9 |

These data show that the capacity of sodium zeolite X for propylene can be restored to its fresh bed value by an oxidative reactivation under the conditions described.

EXAMPLE II

This example illustrates the burn-off of coke deposited on a crystalline zeolitic molecular sieve during a gasoline upgrading process. A bed of calcium zeolite A, 1/16 inch pellets, was used to upgrade a light naphtha feed stream by preferentially adsorbing the normal paraffins in the feed. The vaporized feed stream was passed through the molecular sieve bed at 590° F. until breakthrough of normal paraffins was detected. Normal paraffins were then desorbed from the molecular sieve by reducing the pressure while maintaining the temperature at about 590° F. After the adsorption capacity of the adsorbent bed had fallen to about 75 percent of the fresh bed value, the coke deposited in the upgrading cycles was removed by the reactivation process of the invention. The upgrading cycles were then continued until the adsorption capacity had again fallen to about 75 percent of the fresh bed value, and then a second reactivation process was carried out.

The calcium zeolite A bed was 12 feet long and 1.38 inches in diameter. In the two reactivations, the bed was subjected to different preheating steps to reduce the hydrogen content of the coke. In the first, the bed was heated at temperatures up to 750° F. by means of a stream of hot dry inert gas (nitrogen). In the second, the bed was heated at temperatures up to 750° F. under vacuum. The two burn-off steps were also slightly different. In the first reactivation, the bed was contacted with a gas stream containing about one percent oxygen for about 49 hours and then the oxygen content was gradually increased to 21 percent over a 12 hour period. In the second, the bed was contacted with a gas stream containing about 0.5 percent oxygen for about 37 hours and then the oxygen content was gradually increased to 21 percent over about 13 hours. The experimental conditions are summarized in Table A below. The maximum water vapor concentration in the effluent gas streams during the burnloff step was about 0.051 p.s.i.a.

TABLE A

| Reactivation Process | First | Second |
|---|---|---|
| Preheating Step: | | |
| First Stage | Heat from 572° F. to 750° F. in 2 hrs.; 11.3 s.c.f.h.[1] $N_2$ Purge; Operating Press. 28.2 p.s.i.a. | Vacuum preheating Heat to 600° F. in 2 hrs.; Operating press. 0.05 p.s.i.a. |
| Second Stage | At 750° F. for 6.3 hrs. 11.3 s.c.f.h. $N_2$ purge; Op. Press. 28.2 p.s.i.a. | Vacuum preheating 750° F. for about 5 hrs.; Op. press. 0.05 p.s.i.a. |
| Initial Burn-off: | | |
| Base Temperature (° F.) | 750 | 750. |
| Average Bed Pressure (p.s.i.a.) | 28.2 | 28.2. |
| Influent Gas Rate [1] (s.c.f.h.) | 11.3 | 11.3. |
| Influent $O_2$ Concentration (Mol percent) | 1.0 | 0.5. |
| Time (Hrs.) | 49.2 | 20.6+16.9.[2] |
| Removal of Residual Deposit: | | |
| Temperature, ° F | 750 | 750. |
| Average Bed Pressure (p.s.i.a.) | 28.2 | 28.2. |
| Influent Gas Rate [1] (s.c.f.h.) | 11.3 | 11.3. |
| Influent $O_2$ Concentration (mol percent) | 1.0–21 | 0.5–21. |
| Time (Hrs.) | 12.0 | 12.7. |

[1] Standard cubic feet per hour (s.c.f.h.) were measured at 70° F. and 14.7 p.s.i.a.
[2] This burn-off was interrupted after 20.0 hours for removal of solids samples. The bed was purged with nitrogen at about 900° F. for 2 hours and burn-off at 750° F. was then resumed.

The bed of calcium zeolite A was restored to substantially fresh bed capacity by each of the above-described coke removal processes.

EXAMPLE III

This example illustrates burn-off of a coke deposited from a process stream containing a high concentration of material which rapidly forms coke deposits.

In this example, two beds of 1/16 inch calcium zeolite A pellets were operated in parallel. Both beds were 18 inches long and 1.1 inches in diameter; the operating pressure in the coke deposition cycles and burn-off cycles was about 14.7 p.s.i.a. The beds were saturated with gaseous butadiene at ambient temperature and pressure. A nitrogen purge at a rate of 2.5 s.c.f.h. (measured at 14.7 p.s.i.a., 70° F.) was then started while the temperature was raised to 900° F. in 3.5 hours. This left an average coke deposition of about 3.2 pounds of coke per 100 pounds of calcium zeolite A. One bed was then cooled to a base temperature of 750° F. while the other was held at 900° F. A mixture composed of 1.3 s.c.f.h. of dry air and 22.7 s.c.f.h. of dry nitrogen (oxygen concentration about 1.1 mol percent) was then passed through each column for 180 minutes. During this period the burning zone passed through the bed and the temperature returned to the base values of 750° F. and 900° F. The peak temperature in the 750° F. bed was 175° F. above the base temperature while in the 900° F. bed the peak temperature rise was 250° F. Air was then fed through both beds at a rate of 24 s.c.f.h. for 2 hours. No further temperature rise was noted in the 900° F. bed while a 10° F. change occurred in the one which had been burned at 750° F. The maximum water vapor concentration in the effluent gas streams was about 0.078 p.s.i.a. The beds were then cooled and the cycle repeated. Thirty-four successive coke deposition and burn-off cycles were carried out on each bed. After burn-off cycle 34 the adsorption capacity of the calcium zeolite A pellets was substantially the same as the fresh bed capacity.

The process illustrated by Example III may also be employed to purify isoprene gas streams containing easily polymerized impurities which cause rapid coke formation on the crystalline zeolitic adsorbent.

The reactivation of coked molecular sieves according to the teachings above may consist of one or more steps. When two or more steps are employed it is understood that the direction of flow of purge or feed gas through the bed may be either in the same or opposite directions as desired. That is, the exit end of the bed in one step may become the inlet end for a succeeding step in a multi-step reactivation process.

What is claimed is:

1. A process for reactivating a crystalline zeolitic molecular sieve by oxidative removal of non-volatile carbonaceous matter therefrom, the crystal structure of said molecular sieve being stable at temperatures up to about 1290° F., which process comprises: preheating said molecular sieve to at least the ignition temperature of said carbonaceous matter thereby reducing the hydrogen to carbon ratio of such matter and limiting the water vapor concentration; and contacting said preheated molecular sieve with a hot, oxygen-containing gas to burn said carbonaceous matter, the oxygen concentration of such gas being controlled below a maximum of about one mole percent to maintain the temperature of said molecular sieve below about 1150° F. and to maintain the water vapor partial pressure below about four p.s.i.a.

2. A process for removing coke deposits from a bed of crystalline zeolitic molecular sieve, said molecular sieve having a crystal structure thermally stable at temperatures up to about 1290° F. and said bed having at least one gas inlet means and at least one gas outlet means, which process comprises: preheating at least an inlet end portion of said molecular sieve bed to at least the ignition temperature of said coke thereby reducing the hydrogen to carbon ratio of the coke and limiting the water vapor concentration; and flowing a stream of hot, oxygen-containing gas through said preheated molecular sieve bed from the gas inlet means toward the gas outlet means thereof to burn said coke, while controlling the oxygen concentration in said gas stream below a maximum of about one mol percent to maintain the bulk temperature of said molecular sieve bed below about 1150° F. and to maintain the water vapor partial pressure in the gas stream at said gas outlet below about four p.s.i.a.

3. The process in accordance with claim 2 wherein said burning temperature is maintained in the range from about 900° F. to about 1050° F. and said water vapor partial pressure is maintained below about 0.15 p.s.i.a.

4. The process in accordance with claim 2 wherein said crystalline zeolitic molecular sieve is selected from the group consisting of zeolite A, zeolite X, zeolite Y and erionite.

5. A process for removing coke deposits from a bed of crystalline zeolitic molecular sieve, said molecular sieve having a crystal structure thermally stable at temperatures up to about 1290° F. and said bed having at least one gas inlet means and at least one gas outlet means, which process comprises: preheating said molecular sieve bed at a temperature above about 600° F. thereby reducing the hydrogen to carbon ratio of the coke and limiting the water vapor concentration; and flowing a stream of hot, oxygen-containing gas through said preheated molecular sieve bed from the gas inlet means toward the gas outlet means thereof to burn said coke, while controlling the oxygen concentration in said gas stream below a maximum of about one mol percent to maintain the burning temperature below about 1150° F. and to maintain the water vapor partial pressure in the gas stream at said gas outlet below about four p.s.i.a.

6. The process in accordance with claim 5 wherein said molecular sieve bed is preheated by means of a stream of hot inert gas.

7. The process in accordance with claim 5 wherein said molecular sieve bed is maintained under reduced pressure during preheating, heat being supplied by heating means in contact with said bed.

8. A process for removing coke deposits from a bed of crystalline zeolitic molecular sieve, said molecular sieve having a crystal structure thermally stable at temperatures up to about 1290° F. and said bed having at least one gas inlet means and at least one gas outlet means, which process comprises: (1) preheating at least the inlet portion of said molecular sieve bed to at least the ignition temperature of said coke thereby reducing the hydrogen to carbon ratio of the coke and limiting the water vapor concentration; (2) flowing a stream of hot gas initially containing less than about one mole percent oxygen through said preheated molecular sieve bed from the gas inlet means toward the gas outlet means thereof to burn a substantial portion of said coke; (3) gradually increasing the oxygen content of said hot gas stream to a higher oxygen concentration to burn the residual coke; and at all times during steps (2) and (3) controlling the oxygen concentration in said gas stream to maintain the burning temperature below about 1150° F. and to maintain the water vapor partial pressure in the gas stream at said gas outlet below about four p.s.i.a.

9. A process for removing coke deposits from a bed of crystalline zeolitic molecular sieve, said molecular sieve having a crystal structure thermally stable at temperatures up to about 1290° F. and said bed having at least one gas inlet means and at least one gas outlet means, which process comprises: (1) preheating said molecular sieve bed at a temperature above about 600° F. thereby reducing the hydrogen to carbon ratio of the coke and limiting the water vapor concentration; (2) flowing a stream of hot gas initially containing less than about one mole percent oxygen through said preheated molecular sieve bed from the gas inlet means toward the gas outlet means thereof to burn a substantial portion of said coke; (3) gradually increasing the oxygen content of said hot gas stream to about 20 percent to burn the residual coke; and at all times during steps (2) and (3) controlling the oxygen concentration in said gas stream to maintain the burning temperature below about 1150° F. and to maintain the water vapor partial pressure in the gas stream at said gas outlet below about four p.s.i.a.

10. The process in accordance with claim 9 wherein said molecular sieve bed is preheated by means of a stream of hot inert gas.

11. The process in accordance with claim 9 wherein said molecular sieve bed is maintained under reduced pressure during preheating, heat being supplied by heating means in contact with said bed.

12. The process in accordance with claim 9 wherein said burning temperature is maintained in the range from about 900° F. to about 1050° F. and said water vapor partial pressure is maintained below about 0.15 p.s.i.a.

13. The process in accordance with claim 9 wherein said crystalline zeolitic molecular sieve is selected from the group consisting of zeolite A, zeolite X, zeolite Y and erionite.

14. The process in accordance with claim 9 wherein the oxgen content in step (2) is increased to a concentration between about 20 percent and 100 percent.

References Cited in the file of this patent

UNITED STATES PATENTS

| | | |
|---|---|---|
| 2,162,893 | Kuhl | June 20, 1939 |
| 2,246,950 | Peck | June 24, 1941 |
| 2,265,964 | Carpenter | Dec. 9, 1941 |
| 2,361,182 | Eastman et al. | Oct. 24, 1944 |
| 2,908,639 | Carter et al. | Oct. 13, 1959 |